United States Patent
Chen et al.

(10) Patent No.: US 8,738,644 B2
(45) Date of Patent: May 27, 2014

(54) SINGLE-TAP INPUT REMOTE SERVER ACCESS

(75) Inventors: Hsueh-Chun Chen, Taoyuan County (TW); Chung-Cheng Chen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 492 days.

(21) Appl. No.: 12/165,670

(22) Filed: Jul. 1, 2008

(65) Prior Publication Data
US 2010/0005082 A1    Jan. 7, 2010

(51) Int. Cl.
*G06F 7/00* (2006.01)
*G06F 17/30* (2006.01)

(52) U.S. Cl.
USPC .......................................................... 707/767

(58) Field of Classification Search
USPC .......................................... 707/999.101, 767
See application file for complete search history.

(56) References Cited

U.S. PATENT DOCUMENTS

| | | | |
|---|---|---|---|
| 2005/0188330 A1* | 8/2005 | Griffin | 715/816 |
| 2007/0060114 A1* | 3/2007 | Ramer et al. | 455/418 |
| 2007/0233463 A1* | 10/2007 | Sparre | 704/10 |
| 2007/0257888 A1* | 11/2007 | Chan | 345/169 |

FOREIGN PATENT DOCUMENTS

| | | |
|---|---|---|
| CN | 101013342 A | 8/2007 |
| TW | I282505 | 6/2007 |

OTHER PUBLICATIONS

Research on the Intelligent Chinese Character Input Method Based on Windows Mobile System, P.21~23/34~41, Harbin Institute of Technology, Jun. 2006.
Office action mailed on Jun. 19, 2012 for the Taiwan application No. 098102013, filing date Jan. 20, 2009, p. 1-8.

* cited by examiner

*Primary Examiner* — Alexey Shimatov
(74) *Attorney, Agent, or Firm* — Winston Hsu; Scott Margo

(57) ABSTRACT

The present invention provides a single-tap search method for a mobile phone or portable device having an ambiguity keyboard for searching a remote sever. Via a database on the remote sever, the present invention can provide more keywords for a given ambiguity string. Additionally, when the keywords are found on the database on the remote sever the present invention further searches the database for information related to the keywords.

14 Claims, 2 Drawing Sheets

SINGLE-TAP INPUT REMOTE SERVER ACCESS

BACKGROUND OF THE INVENTION

1. Field of the Invention

The present invention is related to portable devices with remote server access capability, and more particularly, to a portable device that can access a remote server using an ambiguity string.

2. Description of the Prior Art

The mobile phone is a ubiquitous feature of modern life. Fierce competition on the market means that manufacturers are constantly developing new features in order to gain an edge. The mobile phone user therefore has a large variety of options available to him/her, and will often select those that provide him or her with the greatest convenience of usage.

Most mobile phone users are familiar with the traditional 12-key keyboard. As more than one letter/symbol is allocated to each key, a user must utilize a multi-tap input method in order to generate a desired keyword. A number of input methods are currently in use by conventional mobile phones. The multi-tap with timeout method cycles through symbols each time a key is pressed. If, for example, a user wishes to enter the letter 'h', they will have to tap the '4' key twice. Furthermore, if a time between tapping the key exceeds a certain limit, the user will erroneously enter 'gg' rather than the desired 'h'. The long press method cycles through symbols as long as a key is held down. Each time the key is de-pressed a currently displayed symbol will be selected. To select 'h', for example, the '4' key must be held down until 'h' appears on the display screen, and the '4' key is then released/de-pressed in order to select the symbol 'h'. The two-key method utilizes the number keys to indicate which symbol a user wishes to choose. For example, when entering 'h' the user will press '42' as 'h' is the second symbol corresponding to the '4' key. The multi-press with following key method uses a non-number key (for example, an arrow key) to select a symbol. For example, if a user wishes to enter 'h' they must press '44' then press the arrow key to select the currently displayed 'h'. Most symbols therefore require at least two taps of the keyboard in order to be entered, causing the user some inconvenience.

One solution to this problem is to enter a desired word using a single-tap method, and then to search the phone database for a suitable match, as in predictive texting, for example. Predictive texting uses probability to determine which word a user wishes to enter according to the order of the keys pressed. An ambiguity string corresponding to single-tapped keys is sent to the database of the mobile phone/portable device where a match is searched for and generated (if found). For example, '43' is most likely to correspond to the word 'he', and therefore that is the first word that will be generated by the portable device database. This method, however, is dependent on the database being located in the portable device itself. If the database is a remote database, for example an Internet server, then this single-tap method will not work.

SUMMARY OF THE INVENTION

It is therefore an objective of the present invention to provide a single-tap search method for a mobile phone or portable device comprising an ambiguity keyboard for searching a remote server.

A method for searching a remote server using a portable device comprising an ambiguity keyboard, the ambiguity keyboard having a plurality of keys where at least one key corresponds to more than one symbol, comprises: according to a single-tap input of at least one key of the ambiguity keyboard, generating an ambiguity string including at least a symbol corresponding to the key; sending the ambiguity string to the remote server; utilizing a database in the remote server to match the ambiguity string to an existing keyword in the database; and sending the existing keyword back to the portable device.

An electronic device that utilizes the above method is also disclosed. The electronic device comprises: an ambiguity keyboard, the ambiguity keyboard having a plurality of keys, at least one key corresponding to more than one symbol; a character generator, for generating an ambiguity string according to a single-tap input of at least one key of the ambiguity keyboard, the ambiguity string including at least a symbol corresponding to the key; and a transceiving circuit for sending the ambiguity string to a remote server. The remote server utilizes a database to match the ambiguity string to an existing keyword in the database, and sends the existing keyword back to the transceiving circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
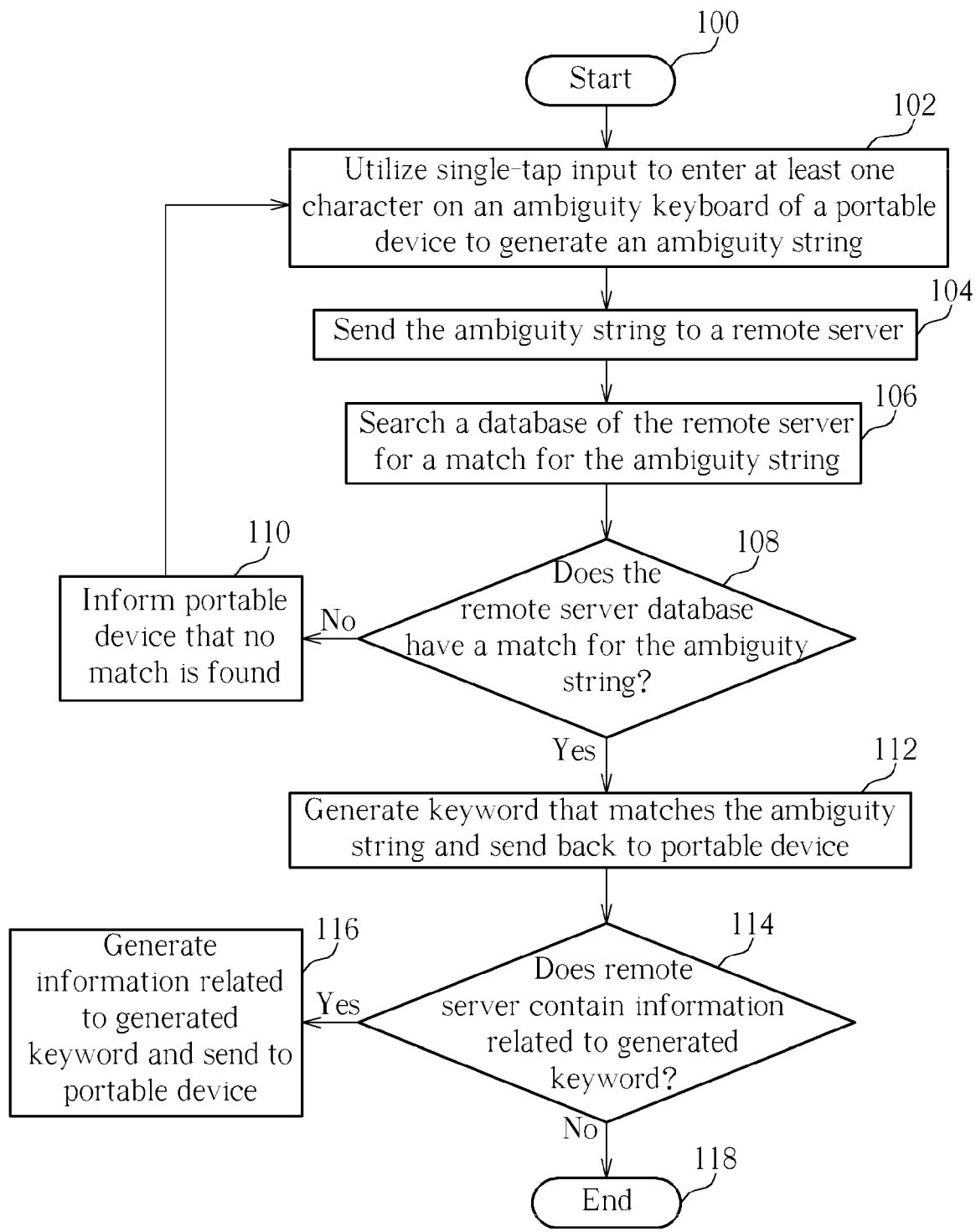
FIG. 1 is a flowchart detailing steps of a method according to an exemplary embodiment of the present invention.

The present invention can be utilized in a mobile phone or any electronic device/computer readable medium having a multi-tap keyboard (ambiguity keyboard) that has remote server access capability.

The user can use a single-tap method for inputting any desired keyword for searching the remote server. If, for example, the user wishes to input the word 'DVD' he/she would normally have to tap the '3' key twice, then tap the '8' key three times, then finally tap the '3' key twice again. The present invention utilizes a single-tap method so the user only has to enter '383'. Rather than searching the portable device database (local database), this ambiguity string will be sent directly to a remote server, where an appropriate match will be made. Although the number of combinations of this ambiguity string is large, the remote server has far greater computational capability and power resources than a local database, and can therefore quickly match the ambiguity string to a keyword stored in the database.

If the ambiguity string "383" matches more than one keyword in the remote database, a candidate list comprising all the matched keywords in a specific order will be transferred to the local mobile phone for user's selection. The specific order could be generated based on the frequency of usage of each matched keyword.

Once the remote server has matched the ambiguity string (383 in this case) to an appropriate keyword, the remote server will send back the matched keyword to the portable device. In this case, after the user has entered the ambiguity string 383, the portable device will receive the keyword DVD. This single-tap input method allows fast access to the Internet or other remote servers.

In addition, the remote server can utilize the generated keyword (DVD in this example) to search for information related to the keyword. Obviously, the remote server has far greater stored information than a local database, and therefore the remote server can generate information related to the keyword at the same time as matching the ambiguity string to the keyword, and send all relevant information instantly to the portable device.

In some cases, the portable device may have a local database, but the user still wishes to utilize the single-tap remote server access method in order to gain access to related information instantly. In this case, the user can select to bypass the local database access and directly access the remote server, as this method is faster, and also more useful if the user wishes to download information. Furthermore, the portable device may have a multi-tap input as the default option, so when the user wishes to use the remote server access option, he/she can simply select this option in order to automatically change the input method from multi-tap to single-tap. The portable device can therefore have a number of input options: multi-tap input; single-tap phone database access; and single-tap remote server input. These embodiments are merely modifications, however, and are not meant to limit the scope of this invention.

Please refer to FIG. 1. FIG. 1 is a diagram of the flow of the present invention. The steps are as follows:

Step 100: Start.

Step 102: Utilize single-tap input to enter at least one character on an ambiguity keyboard of a portable device to generate an ambiguity string.

Step 104: Send the ambiguity string to a remote server.

Step 106: Search a database of the remote server for a match for the ambiguity string.

Step 108: Does the remote server database have a match for the ambiguity string? If yes, go to Step 112. If no, go to Step 110.

Step 110: Inform portable device that no match is found and return to Step 102.

Step 112: Generate keyword that matches the ambiguity string and send back to portable device.

Step 114: Does remote server contain information related to generated keyword? If yes, go to Step 116. If no, proceed directly to Step 118.

Step 116: Generate information related to generated keyword and send to portable device.

Step 118: End.

Figure 2:
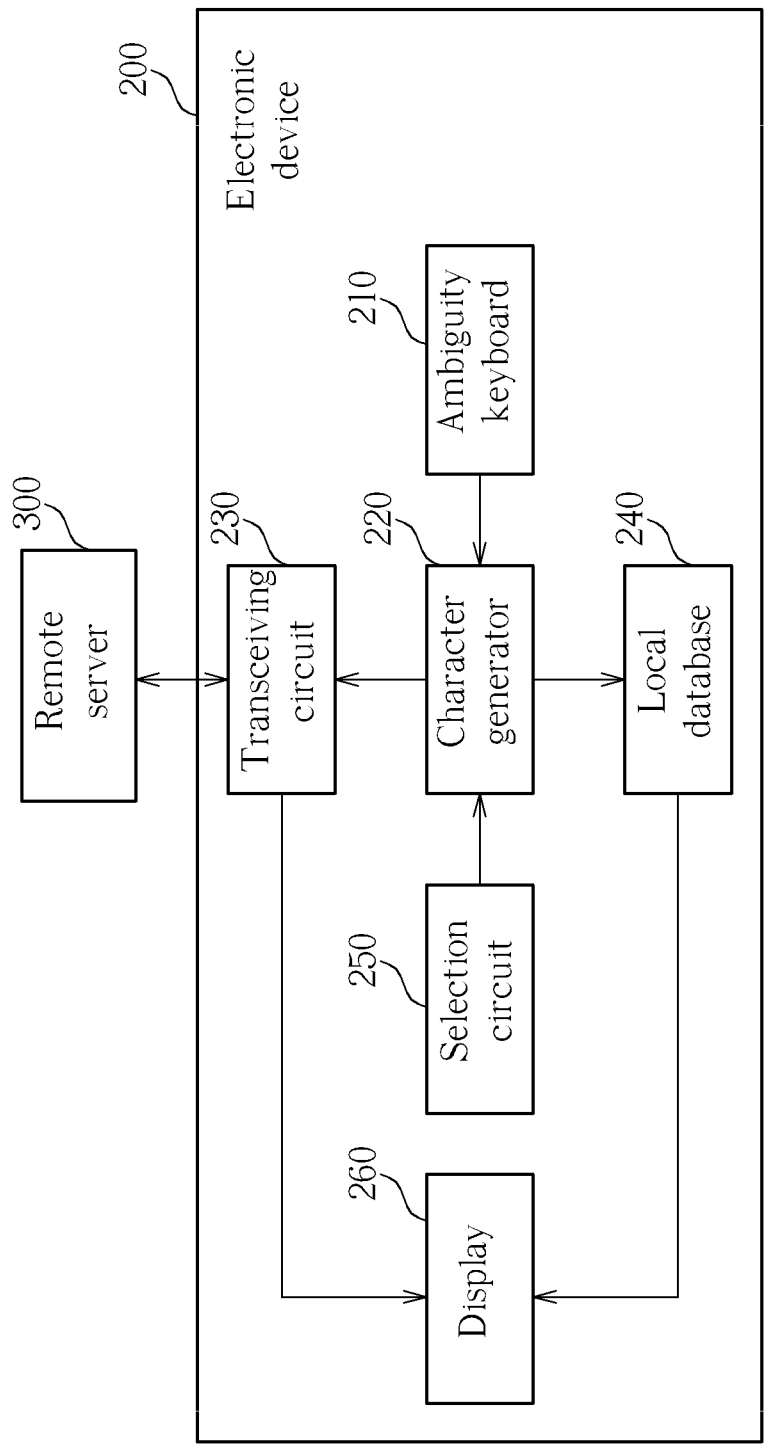
FIG. 2 is a diagram of an electronic device that utilizes the method illustrated in FIG. 2.

Please refer to FIG. 2, which is a diagram of an electronic device 200 that utilizes the above-mentioned method. The electronic device 200 is a computer readable medium, i.e. a medium that can be accessed by a remote server 300 for transceiving the generated ambiguity string. The electronic device 200 comprises an ambiguity keyboard 210, a character generator 220, a transceiving circuit 230 for sending the ambiguity string to the remote server 300, a local database 240, a selection circuit 250, and a display 260. The selection circuit 250 is for bypassing the local database 240 so the electronic device 200 can directly access the remote server 300. As mentioned above, the ambiguity keyboard 210 can be selected to be a single tap keyboard, and this input method is selected automatically when the selection circuit 250 selects to bypass the local database 240.

The character generator 220 is connected to the ambiguity keyboard 210 for generating the ambiguity string in accordance with a user's single-tap input of the ambiguity keyboard 210. The character generator 220 sends the generated ambiguity string to the transceiving circuit 230, which transmits the ambiguity string to the remote server 300, and receives the corresponding keyword and related information (if found) from the remote server 300. This keyword and information are then displayed on the display 260.

It should be noted that when the single-tap input method of the ambiguity function is not selected, the electronic device 200 operates in a conventional way: the ambiguity keyboard 210 can utilize a multi-tap input method, and the electronic device 200 can directly access the local database 240. Information found in the local database will then be displayed on the display 260. The detailed operation of the electronic device 200 can also be understood by referring to the flowchart illustrated in FIG. 1.

As the electronic device of the present invention communicates directly with a remote server, the single-tap input method is appropriate in cases even where the portable device does not have a local database. As the single-tap input method is considerably faster than the multi-tap methods of the conventional art, portable device usage is made far more convenient. Furthermore, by directly connecting to a remote server as soon as the ambiguity string is entered, information related to a desired keyword can be instantly generated and sent to the portable device.

Those skilled in the art will readily observe that numerous modifications and alterations of the device and method may be made while retaining the teachings of the invention.

What is claimed is:

1. A method for searching a remote server using a portable device comprising an ambiguity keyboard, the ambiguity keyboard having a plurality of keys, at least one key corresponding to more than one symbol, the method comprising:

selecting a remote server instead of a local database of the portable device before a database in the remote sever is utilized to match an ambiguity string to at least an existing keyword in the database in the remote sever;

automatically changing an input method of the ambiguity keyboard from multi-tap to single-tap when the remote server is selected;

according to a single-tap input of at least one key of the ambiguity keyboard, generating the ambiguity string including at least a symbol corresponding to the key;

sending the ambiguity string to the remote server;

utilizing the database in the remote server to match the ambiguity string to at least an existing keyword in the database, wherein the ambiguity string and each existing keyword matched to the ambiguity string have a same number of symbols; and sending the existing keyword back to the portable device.

2. The method of claim 1, wherein the step of utilizing the database in the remote server to match the ambiguity string to an existing keyword in the database further comprises:

searching the database for information related to the existing keyword;

and the step of sending the existing keyword back to the portable device further comprises:

sending the information related to the existing keyword back to the portable device.

3. The method of claim 1, wherein the portable device is a mobile phone, a PDA, a PDA phone, a Touch phone, a Smartphone or a UMPC.

4. The method of claim 1, wherein the portable device includes the local database, and the step of selecting between the remote server access and the local database access of the portable device comprises:

selecting to bypass the local database.

5. The method of claim 1, wherein the step of utilizing a database in the remote server to match the ambiguity string to an existing keyword in the database comprises:

when more than one existing keyword in the database matches the ambiguity string, generating a candidate list comprising all matching existing keywords;

and the step of sending the existing keyword back to the portable device comprises:

sending the candidate list to the portable device.

6. An electronic device capable of transceiving telecommunications signals with a remote server, the electronic device comprising:

a selection circuit, for selecting a remote server instead of a local database of the portable device before a database in the remote sever is utilized to match an ambiguity string to at least an existing keyword in the database in the remote sever, wherein an input method of the ambiguity keyboard is automatically changed from multi-tap to single-tap when the remote server is selected;

an ambiguity keyboard, the ambiguity keyboard having a plurality of keys, at least one key corresponding to more than one symbol;

a character generator, for generating the ambiguity string according to a single-tap input of at least one key of the ambiguity keyboard, the ambiguity string including at least a symbol corresponding to the key; and a transceiving circuit for sending the ambiguity string to the remote server;

wherein the remote server utilizes the database to match the ambiguity string to at least an existing keyword in the database, and sends the existing keyword back to the transceiving circuit, wherein the ambiguity string and each existing keyword matched to the ambiguity string have a same number of symbols.

7. The electronic device of claim 6, wherein the remote server also searches for information related to the keyword, and sends the information back to the transceiving circuit.

8. The electronic device of claim 6, wherein the local database is utilized for providing stored information in response to an input from the ambiguity string;

wherein the local database is bypassed when the ambiguity string is sent to the remote server.

9. The electronic device of claim 6, wherein when more than one existing keyword in the database matches the ambiguity string, the database generates a candidate list comprising all matching existing keywords and sends the candidate list back to the transceiving circuit.

10. A non-transitory computer readable storage medium having computer executable instructions stored thereon, the computer executable instructions for searching a remote server using a portable device comprising an ambiguity keyboard, the ambiguity keyboard having a plurality of keys, at least one key corresponding to more than one symbol, the computer executable instructions for performing steps of:

selecting a remote server instead of a local database of the portable device before a database in the remote server is utilized to match an ambiguity string to at least an existing keyword in the database in the remote sever;

automatically changing an input method of the ambiguity keyboard from multi-tap to single-tap when the remote server is selected;

according to a single-tap input of at least one key of the ambiguity keyboard, generating the ambiguity string including at least a symbol corresponding to the key;

sending the ambiguity string to the remote server;

utilizing the database in the remote server to match the ambiguity string to at least an existing keyword in the database, wherein the ambiguity string and each existing keyword matched to the ambiguity string have a same number of symbols; and sending the existing keyword back to the portable device.

11. The non-transitory computer readable storage medium of claim 10, wherein the step of utilizing the database in the remote server to match the ambiguity string to an existing keyword in the database further comprises:

searching the database for information related to the existing keyword;

and the step of sending the existing keyword back to the portable device further comprises:

sending the information related to the existing keyword back to the portable device.

12. The non-transitory computer readable storage medium of claim 10, wherein the portable device is a mobile phone, a PDA, a PDA phone, a Touch phone, a Smartphone or a UMPC.

13. The non-transitory computer readable storage medium of claim 10, wherein the portable device includes the local database, and the step of selecting between the remote server access and the local database access of the portable device further comprises:

selecting to bypass the local database.

14. The non-transitory computer readable storage medium of claim 10, wherein the step of utilizing a database in the remote server to match the ambiguity string to an existing keyword in the database comprises:

when more than one existing keyword in the database matches the ambiguity string, generating a candidate list comprising all matching existing keywords;

and the step of sending the existing keyword back to the portable device comprises:

sending the candidate list to the portable device.

* * * * *